United States Patent
Milos et al.

(10) Patent No.: US 7,529,615 B2
(45) Date of Patent: May 5, 2009

(54) METHOD AND DEVICE FOR CONTROLLING A CHARGING DEVICE OF AN INTERNAL COMBUSTION ENGINE DURING A CHARGING MODE

(75) Inventors: Kristina Milos, Leonberg (DE); Lutz Reuschenbach, Stuttgart (DE); Sabine Wegener, Asperg (DE); Lanouar Chouk, Schwieberdingen (DE); Patrick Menold, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 12/002,061

(22) Filed: Dec. 13, 2007

(65) Prior Publication Data

US 2008/0148828 A1 Jun. 26, 2008

(30) Foreign Application Priority Data

Dec. 22, 2006 (DE) .................. 10 2006 062 213

(51) Int. Cl.
*F02D 41/18* (2006.01)
(52) U.S. Cl. .................. 701/103; 123/361; 73/114.33
(58) Field of Classification Search ......... 701/101–105, 701/110, 115; 73/114.33, 118.02; 123/361, 123/399
See application file for complete search history.

(56) References Cited

U.S. PATENT DOCUMENTS

| | | | | |
|---|---|---|---|---|
| 4,373,490 A | * | 2/1983 | Kimata et al. | 123/452 |
| 5,456,232 A | * | 10/1995 | Firey | 123/430 |
| 5,646,851 A | * | 7/1997 | O'Connell et al. | 701/102 |
| 6,415,779 B1 | * | 7/2002 | Colomby | 123/674 |
| 6,561,016 B1 | * | 5/2003 | Suhre et al. | 73/114.36 |
| 6,947,824 B1 | * | 9/2005 | Livshiz et al. | 701/103 |

* cited by examiner

*Primary Examiner*—Hieu T Vo
(74) *Attorney, Agent, or Firm*—Kenyon & Kenyon LLP

(57) ABSTRACT

A method for setting a mass flow rate of air to be provided in a charging mode; in the charging mode (where a throttle valve is open), the pressure prevailing in an induction pipe only being set via an adjustable mass flow rate of supplied air; a requested torque corresponding to a mass flow rate of air into a cylinder, the mass flow rate of air into the cylinder being adjustable via the pressure in the induction pipe; to set the mass flow rate of air into the cylinder, the pressure in the induction pipe being adjusted by a control system in accordance with a specifiable dynamic charge response characteristic.

10 Claims, 3 Drawing Sheets

METHOD AND DEVICE FOR CONTROLLING A CHARGING DEVICE OF AN INTERNAL COMBUSTION ENGINE DURING A CHARGING MODE

BACKGROUND INFORMATION

To operate internal combustion engines, fuel is injected into cylinders and a corresponding mass flow rate of air is supplied. The mass flow rate of air into the cylinders, which represents the so-called air charge of the cylinders, is adapted to the specific engine state. A setpoint air charge of the cylinders is determined by a torque requested, for example, by the driver; with the aid of a throttle-valve control system, the mass flow rate of air into the engine being controlled, and it being ensured that the actual air charge follows the setpoint air charge as effectively as possible. This is complicated by the fact that not only does the throttle valve have to be set to allow the desired mass to flow into the engine, but also that the volume of the vessel between the throttle valve and engine, the so-called induction pipe, must be filled or emptied as rapidly as possible, i.e., a desired induction-pipe pressure must be built up or reduced.

The volume of the induction pipe causes a requested setpoint air charge to not immediately correspond to the actual air charge, i.e., the actual mass flow rate into the engine. This behavior is normally taken into account by a so-called charge controller, which ensures that the actual air charge builds up with the same dynamic response to the greatest possible extent. In the case of engines controlled with the aid of the throttle valve, this achieves reproducible behavior and rapid response of the engine.

In the case of forced-induction engines, i.e., internal combustion engines having a charging device, such as an exhaust-gas turbocharger, supercharger or similar charging devices, the air charge cannot be adjusted in every operating state with the aid of the throttle valve. In a throttle-valve mode, it may be provided that the pressure in the charge-air line in front of the throttle valve be greater than the pressure corresponding to the desired setpoint air charge, the throttle valve being operated in an adjustment range, in which the pressure (built up by the mass flow rate of supplied air) is throttled away in the charge-air line, in order to set an air charge (pressure) in the induction pipe that is necessary according to the charge controller.

To this end, however, it must be ensured that a sufficiently higher pressure (charge-air pressure) is always available in front of the throttle valve than is intended to be set in the induction pipe in back of the throttle valve, which means that the fuel consumption is increased.

In a charging mode with higher requested air charges, the boost-pressure control system may provide the air charge, the throttle valve being completely open or only slightly throttled. To this end, in the event of a correspondingly high setpoint air charge, the charge control system calculates a setpoint boost pressure, which is then set, in turn, by the boost-pressure control system (of the charging device). A classical boost-pressure control system is made up of, for example, a precontrol unit and a characteristics-map-based PI(D) controller. The precontrol unit is normally operated in a steady-state manner and does not take into account that an induction pipe having a specific volume is situated between the charging device and the engine. In the characteristics-map-based controller, there is no direct relationship between the characteristic dynamic response of the system (i.e., the physics describing this vessel) and the control parameters. Consequently, the characteristics map may also not be readily used for setting a predefined dynamic response characteristic of the charging in the pressure-charged region.

SUMMARY OF THE INVENTION

Therefore, an object of the present invention is to provide a method and a device for setting a mass flow rate of air to be provided in a charging mode in an internal combustion engine, with the aid of which it is possible to reproducibly set the air charge into the cylinder without increasing the fuel consumption.

This object is achieved by the method for setting a mass flow rate of air to be provided in a charging mode in an internal combustion engine according to the present invention, as well as by the corresponding device according to the present invention.

According to one aspect, a method for setting a mass flow rate of air to be supplied in a charging mode is provided. In the charging mode, the pressure prevailing in an induction pipe is only set via an adjustable mass flow rate of supplied air, and not via a throttle-valve position. A requested torque corresponds to a mass flow rate of air into a cylinder, which is adjustable via the pressure in the induction pipe. To set the mass flow rate of air into the cylinder, the pressure in the induction pipe is adjusted by a control system in accordance with a specifiable dynamic charge response characteristic.

In contrast to control of the charging device as a function of operating point, the present invention provides an air-charge control system, with the aid of which an adjustable dynamic air-charge response may be attained. The dynamic charge response ensues from the fact that in the event of a requested torque where the engine is operated in the charging mode, i.e., in an operating range of the internal combustion engine in which the air charge is no longer controlled via the throttle valve, but only via the charging device, a mass flow rate predetermined by the dynamic charge response is requested via the charging device, the mass flow rate being higher than is necessary in a steady state, i.e., than what is currently being requested by the internal combustion engine as a setpoint mass flow rate of air. This results in the pressure necessary for setting the actual mass flow rate of air into the cylinders being able to be reached more rapidly than in the case of previous control systems. In addition, this allows the dynamics of reaching the specific pressure in the induction pipe to be rendered reproducible, which means that the same response of the engine may be obtained in any engine state.

In addition, the pressure in the induction pipe may be set by adjusting the mass flow rate of supplied air. As long as the predefined dynamic response is more rapid than the characteristic dynamic response of the system, in order to increase the mass flow rate of air into the cylinder, the mass flow rate of air supplied, for example, via the charging device during a particular period of time may be selectively increased with respect to the necessary setpoint mass flow rate of air into the cylinder as a function of physics and requested dynamic response, and in order to reduce the mass flow rate of air into the cylinder, the mass flow rate of supplied air may be reduced during a particular period of time in comparison with the setpoint mass flow rate of air into the cylinder.

The specific period of time may preferably correspond to a period of time needed for adjusting the pressure in the induction pipe to a pressure, at which the mass flow rate of air into the cylinder corresponds to the requested torque.

The mass flow rate of supplied air may be provided by a charging device, which supplies the mass flow rate of air to be supplied in a controlled or regulated manner.

The mass flow rate of air supplied with the dynamic charge response characteristic may preferably be set with the aid of a fixed time constant.

According to one specific embodiment, the charging mode of the internal combustion engine is provided when the mass flow rate of air corresponding to the requested torque exceeds a threshold value, and otherwise, a throttle-valve mode is provided which allows for the mass flow rate of air into the cylinder to be controlled by adjusting a throttle-valve position.

According to a further aspect, an engine system is provided for setting a mass flow rate of air to be provided in a charging mode in an internal combustion engine. The engine system includes a charging device for feeding an adjustable mass flow rate of air into the induction pipe, in order to set the pressure which prevails in an induction pipe and determines a mass flow rate of air into a cylinder of the internal combustion engine. The mass flow rate of air into the cylinder is adjusted as a function of a requested torque with the aid of a control unit, by controlling the pressure in the induction pipe in accordance with a specifiable dynamic charge response.

In addition, the engine system may have a throttle valve which is essentially completely opened by the control unit in the charging mode.

The control unit is preferably designed to adjust the mass flow rate of supplied air in order to set the pressure in the induction pipe; to increase the mass flow rate of air supplied via the charging device during a specific period of time with respect to the mass flow rate of air into the cylinder as a function of the desired dynamic charge response characteristic, in order to increase the mass flow rate of air into the cylinder; and to reduce the mass flow rate of air supplied via the charging device during a specific period of time with respect to the mass flow rate of air into the cylinder, in order to decrease the mass flow rate of air into the cylinder.

DETAILED DESCRIPTION

Figure 1:
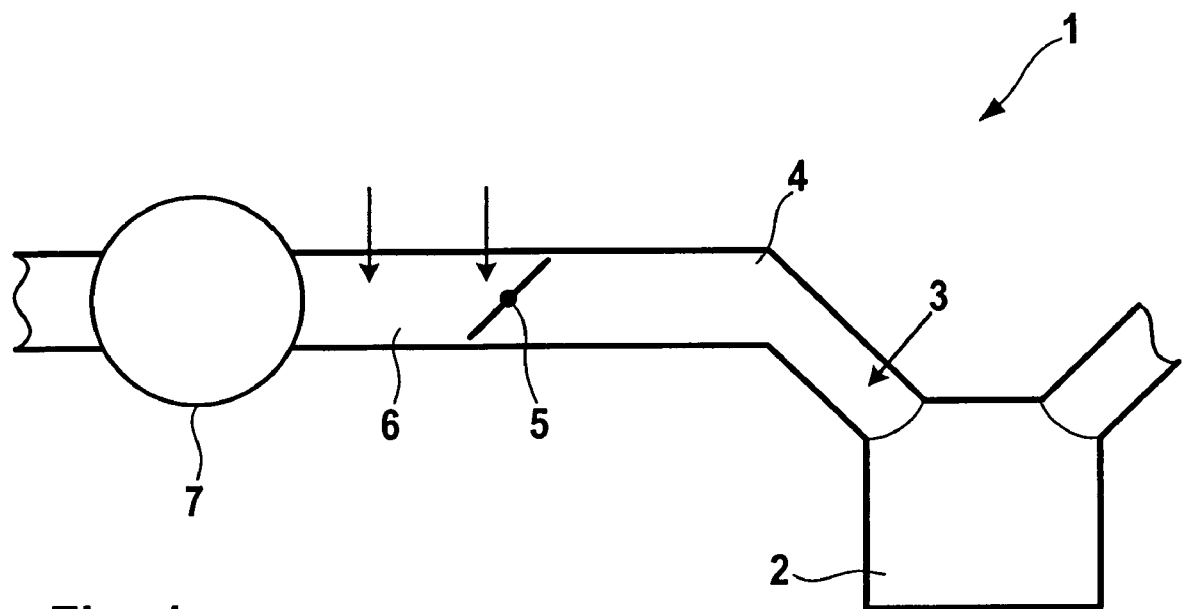
FIG. 1 shows a schematic representation of an engine system in throttle-valve mode.
Figure 2:
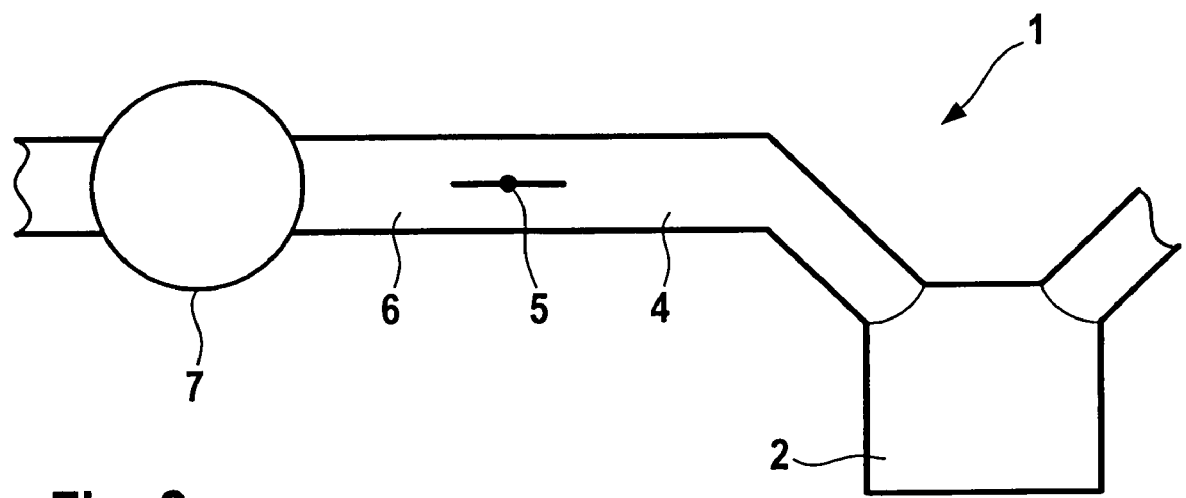
FIG. 2 shows a schematic representation of the engine in charging mode.

FIGS. 1 and 2 show schematic representations of two operating modes of an internal combustion engine 1. Internal combustion engine 1 has a row of cylinders 2, of which only one is shown for reasons of clarity. A mass flow rate of air able to flow into cylinder 2 is provided to cylinder 2 via an intake valve 3, in order to set an air charge there. The mass of air flowing into cylinder 2 is provided in front of intake valve 3 via an induction pipe 4, by providing or building up a specific pressure there in order to effect, in this manner, the desired mass flow rate of air into cylinder 2.

The internal combustion engine may be operated in two operating modes, in a throttle-valve mode and in a charging mode. In the throttle-valve mode, as is represented in FIG. 1, the pressure in induction pipe 4 is adjusted via the position of throttle valve 5, which reduces a higher pressure in a charge-air line 6 situated in front of the throttle valve to the desired pressure in induction pipe 4. The pressure in charge-air line 6 is provided by a charging device 7, such as a supercharger, exhaust-gas turbocharger or the like. In throttle-valve mode, charging device 7 is controlled in such a manner, that it provides a specific pressure or mass flow rate of air, either a constant one or one dependent on the engine speed or other operating parameters, in or into charge-air line 6. This so-called charge-air pressure is reduced by throttle valve 5 to the correspondingly desired, induction-pipe pressure, in order to set the mass flow rate of air into cylinder 2.

If the mass flow rate of air flowing into cylinder 2 reaches a particular magnitude (greater than a specific threshold value), then the pressure difference between the induction-pipe pressure and the maximum charge-air pressure provided is small. The induction-pipe pressure may then no longer be adjusted with sufficient accuracy via throttle valve 5. In this case, in a pressure-charged engine system, it is possible to provide the induction-pipe pressure or any further induction-pipe pressure increase completely via charging device 7. To this end, in charging mode, as illustrated in FIG. 2, throttle valve 5 is open completely or nearly completely, and charging device 7 is provided a control variable that corresponds to a mass flow rate flowing into induction pipe 4. Consequently, in the steady-state case, charging device 7 provides the mass flow rate of air that is intended to flow through intake valve 3 into cylinder 2, as well.

In charging mode, when the desired air charge in cylinders 2 changes, charging device 7 is set to the appropriate value, so that charging device 7 provides the mass flow rate of air that is also intended to flow into the cylinder in accordance with the setpoint air-charge amount (determined by the requested torque). However, such a procedure does not take into account the volume of induction pipe 4, which must initially be loaded with an additional mass of air, or unloaded, due to the necessary pressure to be changed in it, before the induction-pipe pressure or mass flow rate of air into cylinder 2 necessary for the corresponding setpoint air-charge value is yielded.

In order to now adjust (increase/reduce) the pressure in induction pipe 4 more rapidly (than the characteristic dynamic response) to the pressure necessary for providing the setpoint mass flow rate of air into cylinder 2, it is now provided that the mass flow rate of air to be provided by charging device 7 in charging mode be at least temporarily adjusted (increased/decreased) with respect to the necessary setpoint mass flow rate of air intended to flow into cylinder 2 for building up the setpoint air charge. This should allow the necessary pressure in induction pipe 4 to be reached more rapidly and/or the pressure in induction pipe 4 to be adjusted with a specific, predefined dynamic charge response characteristic, in order to render possible reproducible behavior of air-charge changes in cylinder 2 in charging mode.

The building-up of the boost pressure in induction pipe 4 with a desired dynamic charge response characteristic may be described as follows:

$$\frac{V}{RT}\frac{dp}{dt} = ms_A - ms_M \qquad (1)$$

where V corresponds to the volume, T the temperature, R the ideal gas constant, p the pressure in the induction pipe (induction-pipe pressure=charge-air pressure), $ms_A$ the mass flow rate provided by charging device 7, and $ms_M$ the mass flow rate flowing into cylinder 2. For stepwise changes in the setpoint boost pressure, after the step change in the setpoint magnitude, the equation $$ms_A = ms_M + \underbrace{\frac{V}{RT} \cdot \frac{1}{T_S}(p_s - p)}_{m_R} \qquad (2)$$

yields a dynamic boost pressure error response of $$\frac{dp}{dt} = \frac{1}{T_S}(p_s - p) \qquad (3)$$

where $p_s$ represents the setpoint charge-air pressure and $T_s$ represents the time constant of the desired dynamic charging response characteristic. The dynamic charge response characteristic determines the curve by which the error, e.g., after a stepwise change between a setpoint value and an actual value, is reduced; that is, the dynamic response characteristic with which the actual value can follow the setpoint value. In principle, time constant $T_s$ may be freely selected for specifying the desired dynamic response. However, the physical limits of the overall system, which do not allow a time constant that is too small, should be taken into account.

According to formula (2), mass flow rate $ms_A$ into the volume of induction pipe 4 (or of the entire volume of induction pipe 4 and charge-air line 6), which is to be provided by charging device 7, is greater than actual mass flow rate of air $ms_M$ flowing into cylinder 2, which means that the determined boost pressure necessary for the setpoint mass flow rate of air into cylinder 2 may be reached more rapidly in induction pipe 4.

Figure 3:
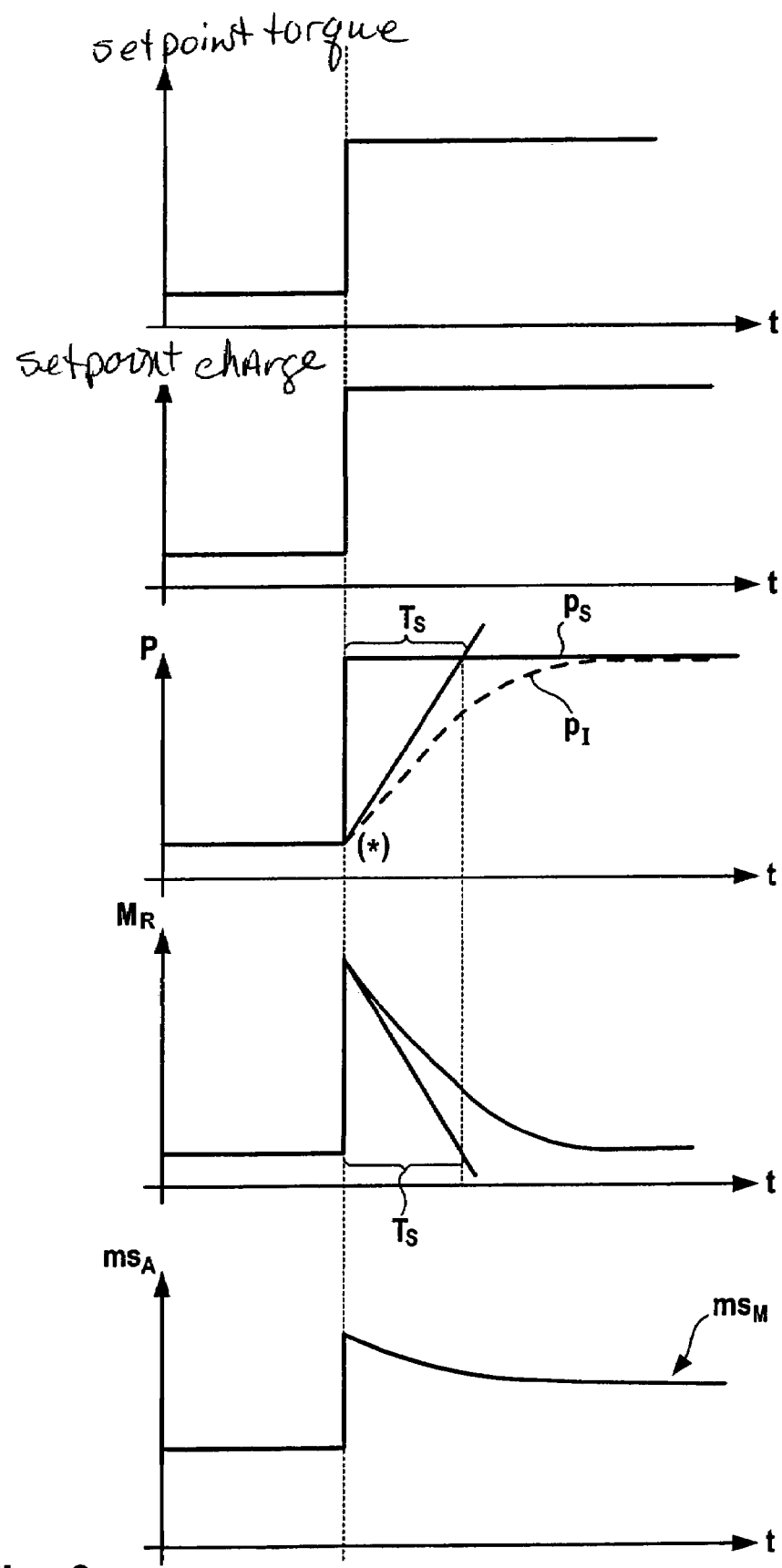
FIG. 3 shows timing diagrams for representing the setpoint air charge of the boost pressure, the mass flow rate of air provided by the charging device, and the mass flow rate of air supplied to the cylinder.

Time characteristics of the requested setpoint torque, the setpoint air charge resulting from it, setpoint charge-air pressure $p_s$ and actual charge-air pressure $p_I$, the differential mass flow rate resulting from the difference between mass flow rate $ms_A$ provided via charging device 7 and mass flow rate of air $ms_M$ into cylinder 2, and mass flow rate of air $ms_A$ to be provided by charging device 7, are in FIG. 3.

One can see that when a step change in the torque is requested, the setpoint air charge also increases abruptly, and likewise the setpoint charge-air pressure $p_s$ in inductor pipe 4 necessary for this. Since the charge-air pressure cannot change in a stepwise manner due to physical reasons, the charge-air pressure increases at a finite slope. In order to build up the charge-air pressure in induction pipe 4 in accordance with a predefined dynamic response characteristic, so that the charge-air pressure sets in, charging device 7 is controlled by control unit 8, in order to provide a mass flow rate $ms_A$, which, in accordance with the dynamic charge response, is greater than mass flow rate $ms_M$ intended to flow into cylinder 2 at the same time. This is only qualitatively represented in the bottom graph of FIG. 3.

Figure 4:
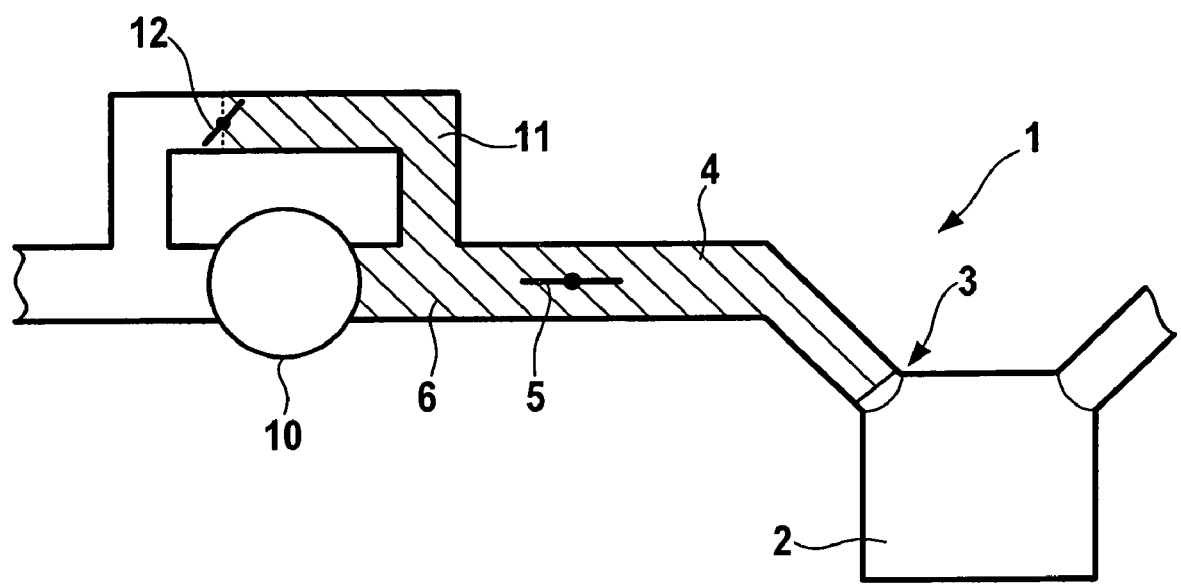
FIG. 4 shows a schematic representation of an engine having a supercharger, where the mass flow rate of provided air is controlled with the aid of a supercharger control valve.

In the represented control concept, a value of mass flow rate of air $ms_A$ to be provided is ascertained, which is provided to charging device 7 as a control variable. Provided mass flow rate $ms_A$ is normally set in accordance with a control system, which is hierarchically subordinate to the control system of the charging pressure. For example, in a system as shown in FIG. 4, in the case in which charging device 7 is implemented as a supercharger 10 having a return line 11 in which a supercharger control valve is situated, the position of supercharger control valve 12 is controlled in a control variable dependent on the mass flow rate to be provided by the charging device.

In such a system, the above-mentioned formula (2) analogously yields the equation:

$$ms_{KRK} = ms_{KPr} - ms_M + \frac{V}{RT} - \frac{1}{T_S}(p_s - p) \qquad (4)$$

where $ms_{KRK}$ corresponds to the mass flow rate of air discharged through supercharger control valve 12 and $ms_{KPr}$ corresponds to the mass flow rate of air supplied by supercharger 10.

What is claimed is:

1. An engine system for setting a mass flow rate of air to be provided in a charging mode in an internal combustion engine, comprising:
    a charging device for feeding an adjustable mass flow rate of air into an induction pipe, in order to set a pressure that prevails in the induction pipe and determine a mass flow rate of air into a cylinder of the internal combustion engine; and
    a control unit for setting the mass flow rate of air into the cylinder as a function of a requested torque by controlling the pressure in the induction pipe in accordance with a specifiable dynamic charge response characteristic.

2. The engine system according to claim 1, further comprising a throttle valve, and wherein, in the charging mode, the control unit substantially completely opens the throttle valve.

3. The engine system according to claim 1, wherein the control unit sets the pressure in the induction pipe by adjusting the mass flow rate of supplied air, to increase the mass flow rate of supplied air during a specific period of time with respect to the mass flow rate of air into the cylinder, in order to increase the mass flow rate of air into the cylinder, and to decrease the mass flow rate of supplied air during a specific period of time with respect to the mass flow rate of air into the cylinder, in order to decrease the mass flow rate of air into the cylinder.

4. A method for setting a mass flow rate of air to be provided in a charging mode, comprising:
    in the charging mode, setting a pressure prevailing in an induction pipe only via an adjustable mass flow rate of supplied air, wherein a requested torque corresponds to a mass flow rate of air into a cylinder, the mass flow rate of air into the cylinder being adjustable via the pressure in the induction pipe; and
    in order to set the mass flow rate of air into the cylinder, adjusting the pressure in the induction pipe by a control system in accordance with a specifiable dynamic charge response characteristic.

5. The method according to claim 4, wherein the pressure in the induction pipe is set by adjusting the mass flow rate of supplied air.

6. The method according to claim 5, wherein to increase the mass flow rate of air into the cylinder, the mass flow rate of supplied air is increased during a specific period of time with respect to the mass flow rate of air into the cylinder, as a function of a predefined dynamic charge response characteristic; and to decrease the mass flow rate of air into the cylinder, the mass flow rate of supplied air is decreased during a specific period of time with respect to the mass flow rate of air into the cylinder, as a function of the predefined dynamic charge response characteristic.

7. The method according to claim 6, wherein the specific period of time corresponds to a period of time needed for adjusting the pressure in the induction pipe to a pressure at which the mass flow rate of air into the cylinder corresponds to the requested torque.

8. The method according to claim 4, wherein the mass flow rate of supplied air is provided by a charging device, which provides the mass flow rate of air to be supplied in a controlled or regulated manner.

9. The method according to claim 4, wherein the mass flow rate of supplied air is set to have the dynamic charge response characteristic with the aid of a fixed time constant.

10. The method according to claim 1, wherein the charging mode of the internal combustion engine is provided when the mass flow rate of air corresponding to the requested torque exceeds a threshold value; and otherwise, a throttle-valve mode is provided which allows for the mass flow rate of air into the cylinder to be controlled by adjusting a throttle-valve position.

* * * * *